(No Model.) 5 Sheets—Sheet 1.

C. B. HOPKINS.
CASH REGISTER AND INDICATOR.

No. 465,269. Patented Dec. 15, 1891.

Fig. 1.

(No Model.) 5 Sheets—Sheet 3.
C. B. HOPKINS.
CASH REGISTER AND INDICATOR.

No. 465,269. Patented Dec. 15, 1891.

Fig. 3.

Witnesses:
Jas. E. Hutchinson
Henry C. Hazard

Inventor:
Cabel B. Hopkins
by Rundle and Russell
his Attorneys (No Model.) 5 Sheets—Sheet 4.
C. B. HOPKINS.
CASH REGISTER AND INDICATOR.

No. 465,269. Patented Dec. 15, 1891.

Witnesses:
Jas. E. Hutchinson
Henry C. Hazard

Inventor:
Cabel B. Hopkins
by Pringle and Russell
his Attorneys (No Model.) 5 Sheets—Sheet 5.
C. B. HOPKINS.
CASH REGISTER AND INDICATOR.

No. 465,269. Patented Dec. 15, 1891.

Witnesses:
Jas. E. Hutchinson
Henry C. Hazard

Inventor.
Cabel B. Hopkins
by Prindle and Russell
his attorneys

UNITED STATES PATENT OFFICE.

CABEL B. HOPKINS, OF LOUISVILLE, KENTUCKY, ASSIGNOR TO THE HOPKINS & ROBINSON MANUFACTURING COMPANY, OF SAME PLACE.

CASH REGISTER AND INDICATOR.

SPECIFICATION forming part of Letters Patent No. 465,269, dated December 15, 1891.

Application filed May 7, 1890. Serial No. 350,905. (No model.)

*To all whom it may concern:*

Be it known that I, CABEL B. HOPKINS, of Louisville, in the county of Jefferson, and in the State of Kentucky, have invented certain new and useful Improvements in Cash Registers and Indicators; and I do hereby declare that the following is a full, clear, and exact description thereof, reference being had to the accompanying drawings, in which—

Letters of like name and kind refer to like parts in each of the figures.

The object of my invention is to provide certain improvements in mechanism for use in registering or registering and indicating apparatus; and to this end my invention consists in the mechanism and in the parts thereof constructed, arranged, and combined as hereinafter specified.

While I shall show and describe my invention herein as applied to a cash register and indicator, I desire it to be understood that it or parts of it can be used equally to advantage with other forms of apparatus—such, for instance, as registers, registers and indicators for other things than cash, calculators, game and other counters, meters, and various other measuring apparatus where an adding or summing up of the movements, registrations, or indications of parts of the apparatus is desired.

In cash registers and indicators as heretofore made and used separate sets of registering devices have been arranged to be operated, respectively, by the different keys or series of keys which are to cause registration of amounts of different denominations of cash. The cent and dollar keys, for instance, have been connected with different registering devices, so as to operate the same independently. While in such form of apparatus it has been usual to ascertain the entire amount received and registered by taking off and adding up the various numbers shown on the different register wheels or devices in the present form of apparatus, as set forth hereinafter, it will be seen that I have provided a most simple, efficient, and accurate adding or summing up mechanism, which will automatically keep the successive amounts registered by the keys for the different denominations of cash added up, so that at any time the entire sum of receipts can be ascertained and read off at once upon mere inspection of the figures shown by the adding mechanism and without the necessity of any computation whatever.

The arrangement, construction, and operation of the keys, indicating devices, and alarm mechanism of the apparatus shown in the drawings of the present case are the same as in my cash register and indicator set forth fully in my United States patent, No. 457,199, granted upon an application pending at the same time with the present one, and need not therefore be described herein at length.

In such drawings, A A designate the casing, which can be of any suitable form and construction to receive and contain the various operative parts of the machine and the supporting-frame B B therefor. The vertically-movable rods C C are, as fully set forth in my said other application, parts of the keys for causing the indications of the various amounts in dollars and cents. Each of them is provided with a heel or rearwardly-projecting portion $c$ for the purpose of actuating my adding mechanism as the respective keys are moved.

Figure 1:
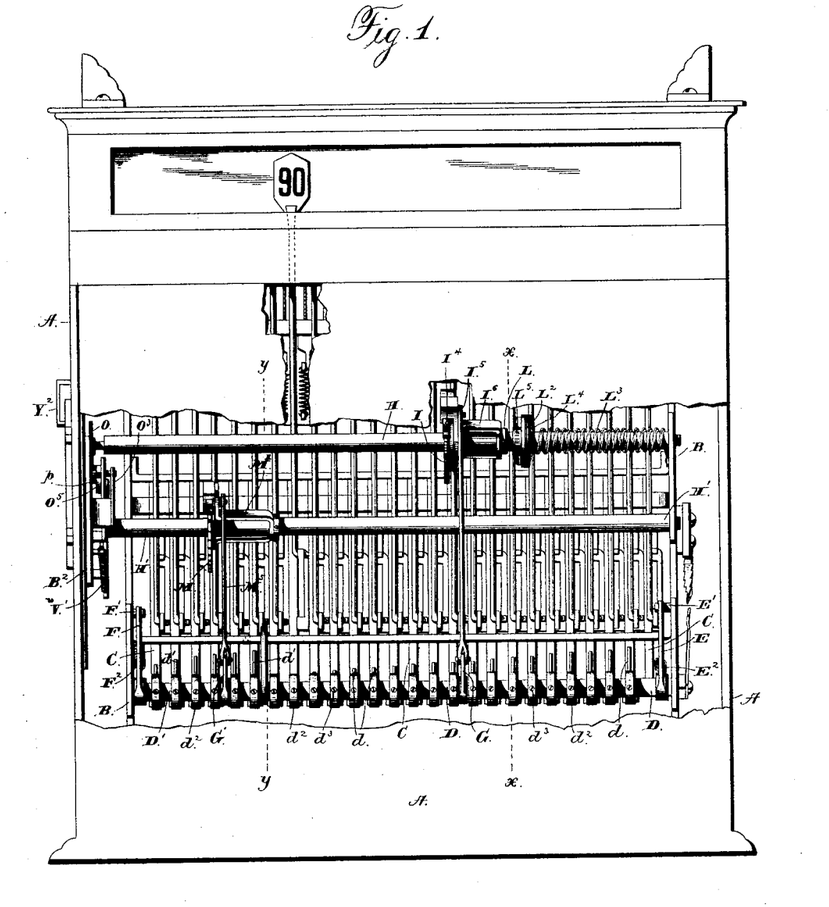
Figure 1 shows a view of my apparatus in rear elevation with a portion of the rear casing removed.

Supported in suitable bearings in frame B B to the rear of the series of portions $c$ $c$ of the keys are the two shafts D and D', the former extending along the series of cent-keys and the latter along the dollar-key series, which is shown at the left end of apparatus in Fig. 1. The number of keys in each of these series can be varied as desired without departure from my invention. I prefer, however, to make the cent-keys nineteen in number, one being the five-cent key, the next the ten-cent one, and so on to the end of the series, the last key being the ninety-five-cent one. The key appearing at the extreme right in Fig. 1 is the change-key to cause unlocking of the cash-drawer when change is to be made and performs no part or function in connection with my registering and adding mechanism as covered by the present application. The dollar-keys, as shown, are six in number, being the one, two, three, four, five, and ten dollar keys, respectively. Their number can obviously be increased or diminished as required to suit the circumstances under which the apparatus is to be used or the desire of the user.

Fixed on the two shafts D and D', respectively, are the series of arms $d\ d$ and $d'\ d'$, extending forward over the portions $c\ c$ of the keys, there being an arm for each key. Said arms, which can be formed on or attached to their shafts in any desired way, are so arranged that as the keys of a series are raised to a certain distance the portions $c\ c$ on the different keys will strike and move the arms through different distances, so as to cause different amounts of rotation of the shaft. The arm to be engaged and moved by the key of the lowest denomination in each series is adapted to be moved the least distance by its respective key, the other arms throughout the series being arranged to be moved successively to greater and greater extents. For the cent-keys the shaft-arms are so arranged that the five-cent key will move its shaft-arm and consequently rotate the shaft one-nineteenth as far as the ninety-five-cent key will, and the intermediate keys, starting from the lowest or five-cent one, will successively move their respective arms and the shaft through a greater and greater number of nineteenths of the movement caused by the key of the highest denomination in the series. With this construction the shaft D will be rotated through one space by the five-cent key, two spaces by the ten-cent one, and so on up to the ninety-five-cent key, which will by its full movement cause rotation of the shaft through nineteen spaces, or nineteen times as much as the amount of turning produced by moving the lowest or five-cent key. In other words, the extent of rotation of the shaft by the different keys correspond with the size of the amount to be indicated or registered by such keys, and the movements of the shaft by the different keys differ, as do the denomination of such keys. The arms $d'\ d'$ on the shaft D' for the dollar-keys are similarly arranged with reference to the engaging key portions $c\ c$, so that movement of the one-dollar key will cause rotation of the shaft through one space, while the raising of the two, three, four, five, and ten dollar keys will turn the shaft through two, three, four, five, and ten spaces, respectively.

Figure 2:
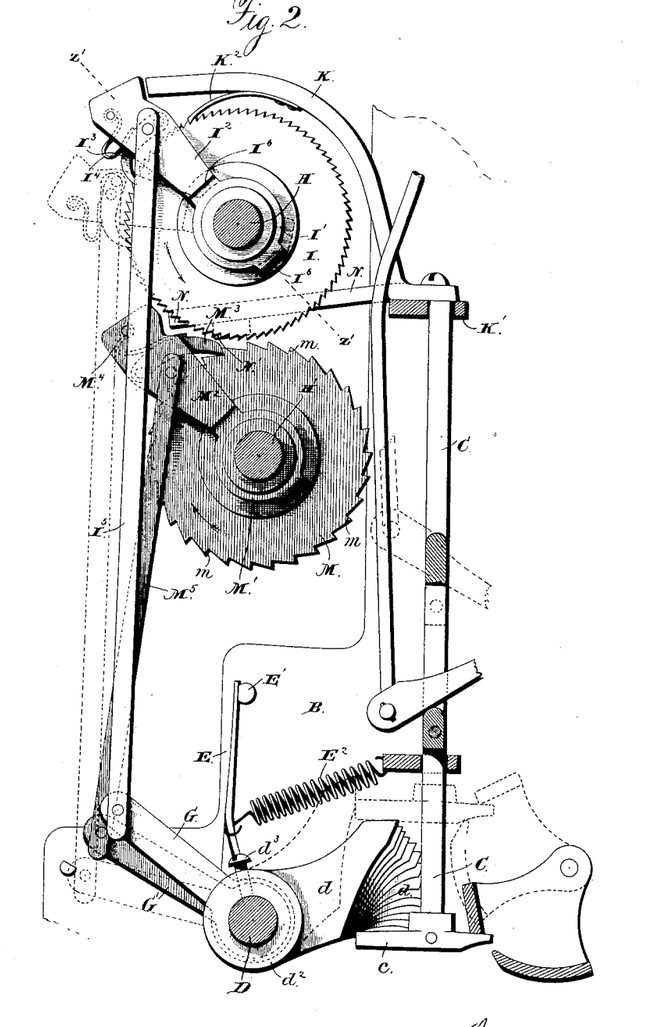
Fig. 2, a view, on an enlarged scale, of a portion of the operative parts of the apparatus on line $x$ $x$ of Fig. 1.
Figure 3:
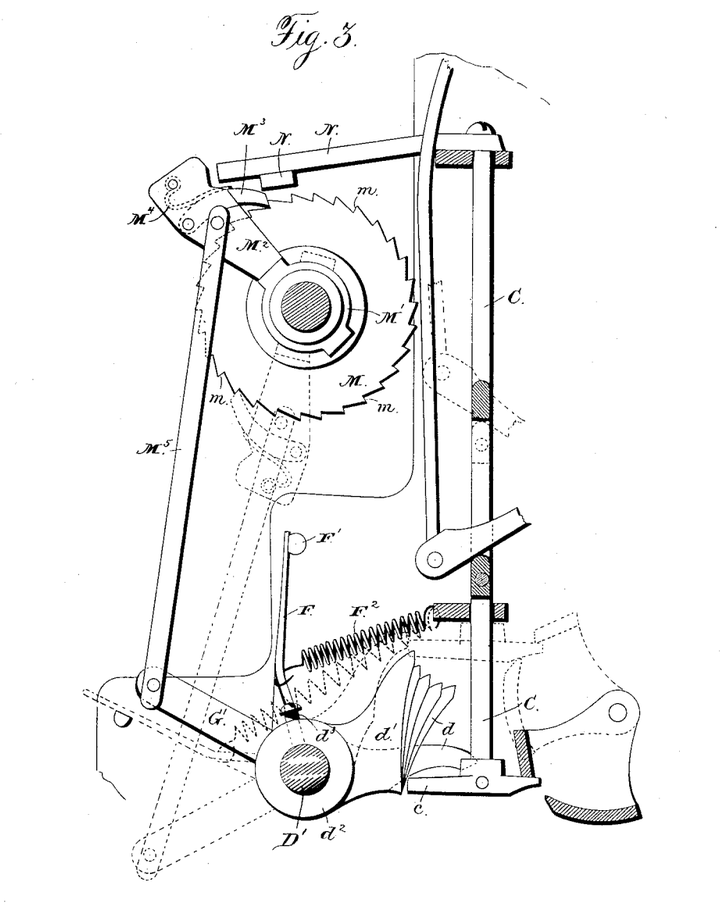
Fig. 3, a similar view of a section on line $y$ $y$ of Fig. 1.

In order to prevent sudden shock and jar or too quick motion of the arms $d\ d$ or $d'\ d'$ as the keys strike them, I prefer to make the faces of the arms which are to be engaged by the key portions $c\ c$ curved, as shown in Figs. 2 and 3, upward and outward over the said key portions, so that the faces presented to the keys are concave ones. With this arrangement the motion of an arm, both when first engaged by a key and as the latter passes up along it, can be made gradual, easy, and without jar.

While the shaft-arms can be formed on or attached to the shafts in any desired way without departure from my invention, I prefer to make each of them with a hub or sleeve $d^2$, provided with a shaft engaging set-screw $d^3$, for fixing it in position.

Attached to shaft D is a stop-arm E, which is adapted to engage a stationary stop E' when the shaft has been rotated to bring its arms $d\ d$ into their normal positions with reference to the keys. A spring $E^2$, attached to such stop-arm or to the shaft itself, as desired, and any suitable fixed support or part of the frame, as shown, tend to retain the shaft in its normal position with the arm E and stop E' in engagement and to return it to such position when it has been rotated or turned rearward by the engagement of a key with one of its arms $d$. The other shaft D' has a similarly-arranged stop-arm F to engage stop F' and spring $F^2$ for moving the arm and holding it against such stop. The arm F is, however, unlike arm E, in that it is made of spring material, so as to yield a little as the shaft turns to bring it with shock against its stop F'. The purpose and object of so making the arm will be set forth hereinafter. Also attached to the two shafts D and D', respectively, are the arms G G', which are so arranged as to project rearward and, preferably, upward from the shafts when the latter are turned to their normal positions, so as to bring their arms E and F in contact with their respective stops E' and F'. Above said shafts and journaled at one end in a suitable bearing-plate B' on the frame and at the other end in the plate $B^2$, which, being supported from or attached to the apparatus frame, also forms a support for the parts of the registering or adding mechanism hereinafter described, are the two shafts H H'. Fixed upon the former of these two shafts above the arm G is the ratchet-toothed wheel I, which, with the apparatus arranged as hereinbefore indicated, has preferably eighty teeth, as shown. Journaled on the shaft beside this wheel is the rocker I', carrying the arm $I^2$, to which is pivoted a pawl $I^3$, held in engagement with the wheel-teeth by a spring $I^4$. Pivotally connected at its opposite ends with the arm $I^2$ and the arm G on shaft D is the connecting-rod $I^5$. The length of these arms and the diameter of the ratchet-wheel I are so arranged relatively that the motion given the shaft D by the five-cent key will cause the pawl-carrying arm $I^2$ to move the wheel through the distance of one tooth in the direction indicated by the arrow in Fig. 2, while the successive keys in the cent series will cause the wheel to be moved a greater and greater number of teeth until the ninety-five-cent key is reached, which, upon being moved throughout its possible travel, will, by turning the shaft D, cause the pawl-arm to rotate the wheel through nineteen teeth. After a key has been moved and released the shaft D is turned back to its normal position by the action of spring $E^2$, causing, through the arm G and the connecting-rod $I^5$, the arm $I^2$ to carry the pawl $I^3$ back over the ratchet-wheel teeth.

Attached to the bar K, which, extending out from the frame-bar K' or any other fixed support, forms a stop for the pawl-arm on its backward travel, is the detent-spring $K^2$, adapted to engage the wheel-teeth and prevent backward rotation of the wheel as the spring-pawl $I^3$ rides back over it. The rocker which carries the pawl-arm can be made in any desired form and be journaled on the shaft in any suitable way. It can be a simple cylindrical hub or sleeve surrounding the shaft, or it can consist, as indicated in the drawings, of two end pieces, which are journaled on the shaft and are connected by the longitudinal pieces $I^6 I^6$. A collar L on the shaft serves to hold the rocker longitudinally in place between it and the wheel I, while leaving it free to rotate.

To prevent overthrow or excess of rotation of shaft H as a key is quickly operated, I provide the former with a disk L', fixed to it, and press against such disk a friction piece or washer $L^2$. Surrounding the shaft and attached at one end to some fixed piece on or part of the apparatus frame is the spiral spring $L^3$, which at its other end is attached to the plate or disk $L^4$, placed loosely on the shaft and serving to hold the friction-washer $L^2$, of leather, rubber, or other suitable material, against disk L'. As shown, the latter is fixed to the shaft by means of a hub $L^5$, pinned or otherwise attached to both disk and shaft. It will be observed that the ratchet-teeth on wheel I and the pawl on the arm $I^2$ are so arranged that the wheel is turned by the pawl as a key is moved to make an indication and registration.

Attached to shaft H' is a ratchet-wheel M, having thirty teeth—that is, three times as many as the dollars of which the highest dollar-key is to cause registration. Journaled on said shaft close to this wheel is a rocker M', like that on shaft H, already hereinbefore described, having the arm $M^2$, carrying the pawl $M^3$, and spring $M^4$ for holding the latter in engagement with the wheel-teeth. The rod $M^5$, pivotally attached to the arms $M^2$ and G', serves to connect the same together, so that as the latter is swung downward by the engagement of a moved key with one of the arms on the shaft D' and upward again by the action of spring $F^2$ when the key falls the pawl-arm will be caused to correspondingly descend and rise again. The extent of the downward movement of the two connected arms will be dependent upon the amount of rotation of the shaft caused, as hereinbefore described, by the movement of one of the dollar-keys, and will therefore correspond with the denomination of the key which is moved. By the movement of the two, three, four, five, or ten dollar key the pawl-arm $M^2$ will be carried down two, three, four, five, or ten times as far as when the one-dollar key is actuated. The ratchet-teeth $m\ m$ on wheel M and the spring pawl $M^3$ are so arranged that the teeth are positively engaged by the pawl, not as the pawl-arm descends, but as it swings back toward its normal position under the influence of the spring $F^2$ upon the arm F of the shaft D'. The diameter of the wheel and size of the teeth are such that the pawl will be carried down over one, two, three, four, five, or ten teeth as the pawl-arm is caused to descend by the actuation of the one, two, three, four, five, or ten dollar key. The return of the arm $M^2$ under influence of spring $F^2$ to its normal position after the key has been released will then, by the engagement of the pawl $M^3$ with one of the teeth $m$, cause the wheel to turn forward one, two, three, four, five, or ten teeth, according as one or the other of the dollar-keys has been actuated.

From the drawings and description above given it will be observed that the ratchet-wheel M for the dollar-keys is caused to rotate during the return of the pawl-arm $M^2$, due to the action of spring $F^2$, while the cent-keys ratchet-wheel is turned by the pawl $I^3$ on arm $I^2$ as a cent-key is actuated and before the latter is released or returns toward its normal position. With this construction of the mechanism for turning the dollar-key ratchet-wheel M there can obviously be no chance of overthrow or excess of rotation of the wheel by quick movement of any dollar-key. A stop N stands in the path of the pawl-arm $M^2$ at a point slightly forward of the normal position of the contacting part of the arm. On its under side this stop has a block or lug N', just above the ratchet-wheel M, in position to be engaged by the inclined top of pawl $M^2$ as the latter reaches and passes slightly beyond its normal or starting position. The stop N and lug N' are so arranged with relation to each other and to the arm M and pawl $M^2$ that as the arm strikes the stop the lug N' will force and hold the pawl down upon the ratchet-wheel so that the teeth behind the pawl end cannot pass under such end, and the wheel will be effectually held from rotating farther or beyond the point to which the pawl itself has turned it.

When the spring-stop arm on shaft D' is brought by the rotation of the latter under stress of spring $F^2$ up against its stop, it yields a little to the power of momentum of the parts moving with or moved by the shaft, and then, the momentum having been overcome, it returns to its normal position again. This yielding and springing back of arm F allows the pawl-arm to travel against its stop N and the pawl $M^2$ to be forced under the brake-block or stud N' for the purpose hereinbefore set forth, and then causes the pawl-arm to move back to its normal position just to the rear of its stop N. For securing the action described the power of the spring-arm F must obviously be greater than that of spring $F^2$.

With the ratchet-wheel I provided with teeth eighty in number, or four times the number of times five cents is contained in one dollar, the wheel and shaft H will be rotated through one-quarter turn for each dollar in the sum of the amounts indicated by the various cent-keys which may be moved. I prefer to have the wheel with its eighty teeth in order that its motion caused by the highest or ninety-five cent key is but such a fraction of a full rotation as can be easily and conveniently given it by a partial turning of shaft D and a swinging of arms G and $I^2$ through short arcs. For the same reason the wheel M has thirty ratchet-teeth, such number being three times that of the dollars to be registered as the highest dollar-key is actuated. With this arrangement this ratchet-wheel can be turned through the distance of ten teeth to cause registration of ten dollars without an inconvenient amount of motion of a key-shaft D' or arms G' and M'.

Fixed upon shaft H close to its bearing in plate $B^2$ is the gear-wheel O, which meshes with the pinion O', which has one-quarter as many teeth as has the gear-wheel, and whose arbor $O^2$ is journaled at opposite ends in the plate $B^2$ and an arm $O^3$ on the plate $O^4$, which is attached to the former plate by suitable posts or distance-pieces. With the teeth on the gear-wheel and pinion relative in number, as described, the pinion will obviously be turned through one complete revolution for each quarter-turn of the gear-wheel O and shaft G, or for each movement of the ratchet-wheel I through the distance of twenty of its teeth, by the actuation of the different cent-keys. Attached to pinion O' or to its arbor $O^2$ is the snail or spiral cam $O^5$, having its parts of greatest and least radius connected by an abrupt or radial surface. Pivoted to plate $B^2$ is the swinging lever P, provided with a pin $p$ to engage the cam $O^4$, and carrying the pawl P', held by spring $p'$ in engagement with the teeth of the wheel R, which is fixed on the shaft H' and, like the ratchet-wheel M on such shaft, has thirty teeth. A spring $P^2$, attached at one end to the lever P and at the other to any suitable support, keeps the lever, with its pin $p$, pressed against the cam $O^4$, and when the part of the latter of greatest diameter has passed the pin swings the lever quickly forward to cause the pawl P' thereon to move the wheel R one tooth. Attached to the outer end of pinion-arbor $O^2$ on the outer side of plate $B^2$ is the cents-disk S, carrying the circular series of figures running 0, 5, 10, 15, 20, and so on, up to and including 95, to be successively brought by the revolution of the disk around to the display-opening $t$ in plate T. The cam $O^5$ is so arranged with reference to the figures on the disk that as the figure 95 passes and the figure 0 comes around to the display-opening the part of the cam of greatest radius passes out of engagement with the lever-pin $p$ and allows the lever to be drawn forward by spring $P^2$, so that pawl P', engaging the wheel R, will turn the latter one tooth. Attached to the same shaft H' with this wheel R is the dollar dial-disk S', provided with a circular series of figures composed of three sub-series, each running 0, 1, 2, 3, and so on, up to and including 9, and adapted to be brought successively by rotation of the wheel R or shaft H' around opposite the second display-opening $t'$ in plate T. With the arrangement described each time that the ratchet-wheel I on shaft H is turned one, two, three, or more teeth by the actuation of the five, ten, or fifteen cent or higher key the dial-disk S will, if its zero-mark be opposite to the display-opening, be turned to bring its five, ten, fifteen, or higher figure around to such opening. Each time that the disk is turned through a whole revolution, so as to bring its zero-mark around to the display-opening again, the lever P, with its pawl P', will rotate the wheel R and the dollar-disk S' on the dollar-shaft H' through one space, so as to bring the next higher figure on said disk around to the display-opening $t$. For each dollar in the sum of the denominations of the different keys that may be actuated the disk S will be turned around to zero again and the disk S' will be turned forward through one of its numbered spaces.

On wheel R, at equal distances from each other, are the three pins $r'\ r'\ r'$, adapted to successively engage the pivoted lever U as the wheel revolves and to pass off of the end of the same just as the zero-marks on the dial-disk S' arrive at the display-opening $t$. A spring U' serves to hold the lever end inward in the path of the pins and to swing the lever as each pin passes off of its end. Such swing of the lever under stress of the spring can be, as in the case of the other similar levers to be described, limited in any desired way—as, for instance, by letting the lever end strike against a hub on wheel R, the shaft on which the wheel is fixed, or any other abutment or stop for that purpose. Pivoted on the lever U is the pawl $U^2$, held by spring $U^3$ in engagement with the teeth of wheel R', so that when the lever end has been moved and released by one of the pins $r'$ the return swing of the lever will cause the wheel to be turned one tooth. There are on said wheel twenty teeth, and on the dial-disk $S^2$, attached to the wheel-arbor, is the circular series of figures, consisting of two sub-series, in which the numbers run 0, 1, 2, 3, and so on, up to and including 9. Two other wheels $R^2$ and $R^3$, having the same number of teeth as wheel $R'$ and rigidly connected, respectively, with disks $S^3$ and $S^4$, which are like dial-disk $S^2$ in their markings, are supported on arbors journaled in the plates $B^2$, and each of the wheels $R'$ $R^2$ $R^3$ can be supported or journaled in any desired way in the frame or any plate thereon and can have their disks attached directly to them or to their arbors, as shown.

Suitable display-openings $t^2$, $t^3$, and $t^4$ are provided in the plate T for showing one at a time the numbers on the respective dial-disks $S^2$, $S^3$, and $S^4$.

On each of the wheels $R'$, $R^2$, and $R^3$ are two pins $r^2$ $r^2$ diametrically opposite each other and similarly situated with reference to the zero-marks on the respective dial-disk. Pivoted to the plate $B^2$ in position to be engaged and swung by the pins on the wheels $R'$ and $R^2$, respectively, as such wheels revolve are the two pawl-levers which, like lever U, already described, have pivoted pawls $U^2$, pawl-spring $U^3$, and springs $U'$ to hold the levers with their ends in the path of the wheel-pins. The pawl on the lever which is to be engaged by the pins on wheel $R'$ is in engagement with the teeth of wheel $R^2$, while that on the other lever engages the teeth of the last wheel $R^3$. The surfaces on the various pawl-levers which are to be engaged by the wheel-pins $r'$ or $r^2$ are preferably made curved, as shown, to get an easy gradual movement or outward swing of the levers; but such construction is not necessary.

Figure 4:
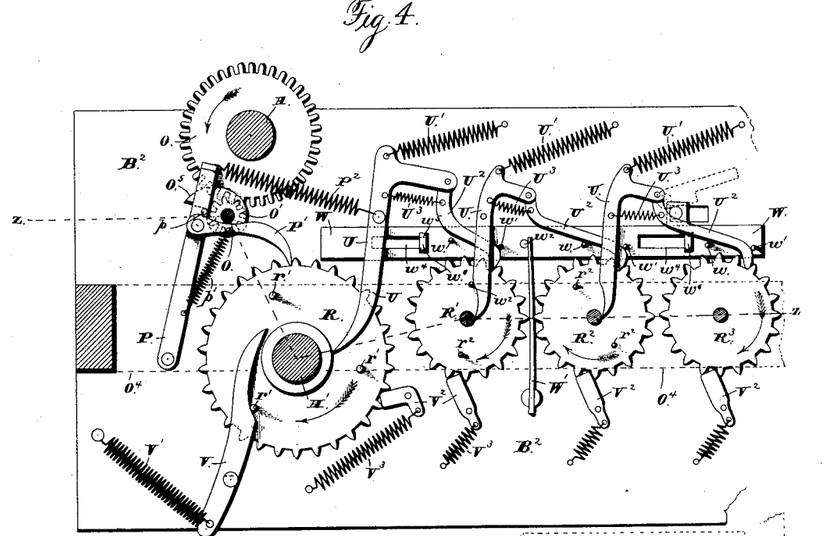
Fig. 4, a detail enlarged view showing in side elevation the adding-wheels and operating mechanism therefor as they appear from within the casing, the support for the inner ends of the wheel-arbors being shown in dotted lines.
Figure 5:
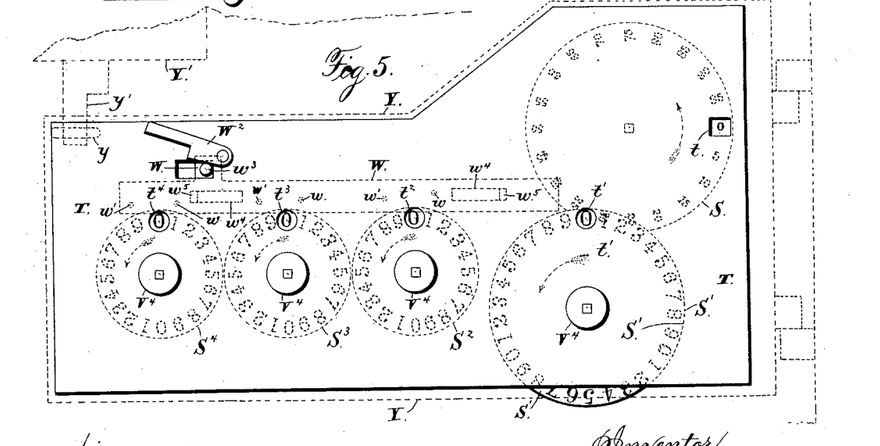
Fig. 5, a view showing in elevation the outer side of the apertured dial-plate covering the adding-wheels.
Figure 6:
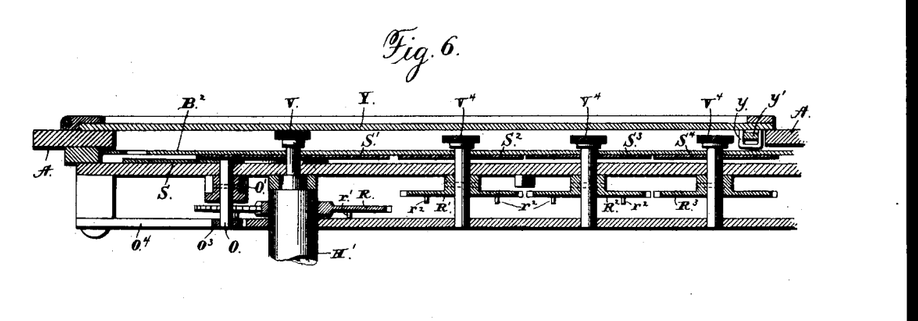
Fig. 6, a view of a longitudinal section on line $z$ $z$ of Fig. 4, and Fig. 7 a longitudinal sectional view on line $z'$ $z'$ of Fig. 2.
Figure 7:
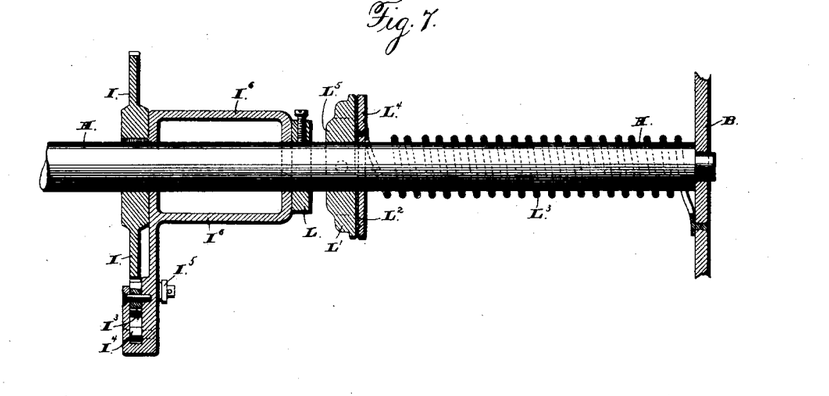

To prevent "jumping" of the wheel R when one of its pins $r'$ $r'$ passes off of the end of lever U, I provide a brake-lever V, held by spring $V'$ so that its end stands normally in the path of said pins in such position that as one of the pins passes off of lever U another one will be in engagement with the spring-pressed brake-lever, as indicated in Fig. 4. Detent-pawls $V^2$ to be held in action by springs $V^3$, as shown, or by gravity, if desired, engage the teeth on wheels R, $R'$, $R^2$, and $R^3$, respectively, so as to prevent back movement of the latter as the pawls $P'$ and $U^2$ ride back over the wheel-teeth.

Beyond plate T on the extreme outer end of each of the shafts or arbors upon which the dial-disks S, $S'$, $S^2$, $S^3$, and $S^4$ are fixed I place a turning-head $V^4$, by which the disk can be turned to set it with its zero-mark appearing through the display-opening in plate T. In order that the disks may be set independently by turning them forward without causing rotation of a succeeding disk in the series, I provide the sliding bar W, supported on the plate $B^2$ and having the pins $w$ $w$, one for each pawl $U^2$, adapted to ride under the pawls and lift their ends out of engagement with the teeth on wheels $R'$, $R^2$, and $R^3$, respectively, when the bar is moved in one direction, but standing out of engagement with the pawls when the bar has been moved in the other direction. Other pins $w'$ $w'$ are arranged on the bar W, so that when said bar has been moved so as to leave the pawls free to act they will be in position to engage the upper sides of the ends of the pawls when the latter reach the outer limit of their forward motion. With the pawl ends rounded or inclined on their upper sides, as shown, the pins $w'$ $w'$ will obviously hold them down upon the toothed wheels, so that the next succeeding tooth on the latter cannot pass under the respective pawls. All chance of jumping or overthrow of the wheels is thus prevented.

A spring $W'$, engaging a lug or pin $w^2$ on the bar, acts to hold the latter normally in position to leave the pawls $U^2$ free to engage the teeth on the dial-wheels, as shown in Fig. 4, while for holding it as moved to raise the pawls away from the wheel-teeth during a selling operation I provide the latch $W^2$, pivoted on plate T and having the shoulder to engage and hold a pin or stud $w^3$ on the bar.

To cover the dial-plate T and prevent access, except by authorized persons, to the dials and dial-setting devices, I contemplate hinging to the casing A a plate Y, which can be locked shut by any desired means. In order that the same lock may be used to fasten this plate and the usual hinged cover $Y'$ for the front of the casing, I provide said plate Y with a hasp $y$ to be engaged by a tongue $y'$ on the cover when the latter is shut.

When the casing lid or cover is fastened in the usual way—as, for instance, by a lock, (indicated at $Y^2$,) with its bolt to engage a suitable stud or hasp on the cover—the plate Y will be securely fastened to protect the dials and setting devices from being tampered with. Any desired form of supporting and guiding devices for bar W can be used. As shown, the bar is provided with longitudinal slots $w^4$ $w^4$, which engage studs $w^5$ $w^5$, fixed on plate $B^2$ and having heads $w^6$ $w^6$ overlapping the slot sides, so as to hold the bar in place, while leaving it free to reciprocate.

The operation of my apparatus, as hereinbefore described and shown in the drawings, is briefly as follows: As any one of the cent-keys is moved its projecting portion or heel $c$, striking the curved surface of the corresponding arm $d$ on shaft D, will cause the arm to move and the shaft to revolve through a distance corresponding with the number of five cents in the amount to be indicated by the key, or which is marked on the latter. The five-cent key will by its complete upward movement turn the shaft and swing the arm G down through one space, while the successive ten, fifteen, twenty, and other keys in the series will move the arm G and shaft through two, three, four, and a greater number of spaces up to nineteen. As the forty-five-cent key, for instance, is actuated the arm G will be swung through nine spaces, and by means of the connecting-rod $I^5$ and pawl-carrying arm $I^2$ will rotate the ratchet-wheel forward nine teeth. This rotation of the ratchet-wheel and shaft H, on which it is fixed, causes the wheel O to turn the pinion O' and dial-disk S, connected with the latter, so that the number 45 on the disk will be brought around to the display-opening $t$. The movement of any other key would have similarly caused less or greater turning of the disk to display a greater or smaller disk number, corresponding with the denomination of the key. The spring-held plate $L^4$, pressing the friction disk or washer $L^2$ against the disk L', fixed on the shaft H, serves as a brake to prevent overthrow of the shaft or the dial-disk S, connected with the latter by the gearing, as described. When the actuated key is released, the shaft D is turned back by spring $E^2$, causing the two connected arms G and $I^2$ to rise and the pawl $I^3$ to ride upward over the teeth of ratchet-wheel I to its normal position again. As the pawl-arm flies upward it strikes and is checked by its stop K. When any one of the dollar-keys is raised, its projection or heel, striking the corresponding curved arm $d'$ on shaft D', turns such shaft a distance corresponding with the denomination of the key, and through arm G' and connecting-rod $M^5$ draws arm $M^2$ down so that its pawl travels over one, two, three, four, five, or ten teeth of the ratchet-wheel M on shaft H', according as the key moved is the one, two, three, four, five, or ten dollar one. When the key is released after being fully moved, the pawl-arm $M^2$ will, by the action of the spring $F^2$ in returning shaft D' to its normal position, cause the pawl $M^3$ to rotate the ratchet-wheel M through the number of teeth over which the pawl traveled on its downward movement. When the pawl-arm reaches its normal position, it passes slightly beyond it and strikes the stop N, while its pawl $M^3$, riding under lug N', is forced down between the ratchet-teeth on wheel M, so that the tooth behind the pawl end cannot pass under the same, and consequently the wheel cannot rotate farther. By the action of the spring stop-arm F, which has yielded slightly to allow the extra movement of the pawl-arm described, the shaft D' and said arm, through its connections with the shaft, are returned to their normal starting-points, beyond which they have traveled. The pawl $M^3$, thus being released from block or lug N', rests upon the ratchet-wheel teeth in such way as not to interfere with the forward rotation of the wheel by the means and in the manner to be described. By the rotation of the wheel M through one, two, three, four, five, or ten teeth the dial-plate S', attached to shaft H', will be turned through a corresponding number of its numbered spaces, so that, starting with the zero-mark opposite the display-opening $t'$, the figure 1, 2, 3, 4, 5, or 10 will be caused to appear at such opening. As the ratchet-wheel I on shaft H is turned through twenty teeth by the successive action of two or more of the cent-keys, the gear-wheel O, being rotated one-quarter around, will give the pinion O', the cam or snail $O^5$, and the dial-disk S, turning therewith, a full revolution. Each time that the disk is thus turned to bring its ninety-five-cent mark past and its zero to the display-opening $t$ the spring-actuated pawl-arm P, having been moved back and then released by the snail or cam $O^5$, will, through its pawl P', move the wheel R one tooth, thus rotating the dollar dial-disk S' forward one of its numbered spaces. The number of dollars in the sum of the denominations of the cent-keys successively actuated will then be transferred to and added up on the dollar dial-disk S'. Nor can the proper turning of this disk to register such number of dollars interfere with or be interfered with or confused by the simultaneous actuation of one of the dollar and one of the cent keys, for the ratchet-wheel I is moved by the cent-keys as they are raised, while the dollar ratchet-wheel M is turned only as a dollar-key falls after being raised. Both a dollar and one of the cent keys can then be actuated simultaneously to indicate one or more dollars and any number of cents, and the amounts will be accurately and certainly added up on the cent and dial disks. As the dollar dial-disk S' is turned through ten of its numbered spaces to bring one of its zero-marks around to the display-opening $t'$ the ten dollars thus added up is transferred to or added upon the ten-dollar dial-disk. The end of the spring-pressed lever U passes off of one of the pins $r'$ on wheel R, and by the swing of the lever under stress of its spring U' the pawl $U^2$ turns the wheel R' one tooth and consequently rotates the ten-dollar dial-disk $S^2$ forward through one numbered space. As the latter disk is turned ten spaces the second spring-actuated pawl-lever U, passing off of one of the pins on wheel R', moves its pawl to turn the one-hundred-dollar wheel $R^2$ one tooth and the connected disk $S^3$ one numbered space. By a similar operation of the third pawl-lever U the tens of hundreds of dollars are added up from disk $S^3$ upon disk $S^4$. The entire sum of the denominations of the various cent and dollar keys which may have been operated can then be seen at once upon inspection of the figures showing through the different display-openings $t$, $t'$, $t^2$, $t^3$, and $t^4$. The figures appearing at openings $t'$, $t^2$, $t^3$, and $t^4$, respectively, will show the number of dollars and of the tens, hundreds, and thousands of dollars, while the figure appearing at opening $t$ will give the number of cents. The whole sum added up can then be read off quickly from left to right and no further addition or computation is necessary to determine the aggregate of the denominations of all the keys which have been operated.

The number of dial-disks and means for turning them in the manner indicated hereinbefore can obviously be increased, as desired, where it is intended to add up beyond the thousands of dollars. The pawl-lever actuating pins on wheels R, R', $R^2$, and $R^3$ and the sub-series of figures on the respective dial-disks can also be varied in number without departure from my invention—that is, there can be one or more of the pins on each wheel and one or more series of figures running from 0 to 9 on the corresponding dial-disks. When the disks are to be set back to zero again, the bar W is moved longitudinally, so that its pins $w\ w\ w$ engage and lift the pawls $U^2\ U^2\ U^2$ out of engagement with wheels $R'$, $R^2$, and $R^3$, and the latch $W^2$ is moved into engagement with the lug $w^3$, so as to hold the bar as moved. By the turning-heads $V^6$ the several dial-disks can then be independently turned forward until a zero-mark on each of them shows through a display-opening. The latch $W^2$ is then raised and the spring $W'$ immediately throws the pawl-tripping bar back to its normal position again with its pins $w$ out of engagement with the pawls.

My apparatus and mechanism, as described hereinbefore and shown in the drawings, affords a simple, efficient, and accurate means for adding up or integrating all the amounts indicated by the movements of the various keys and showing the sum so that it can be read off at once at any time or times.

As stated hereinbefore, said apparatus or parts of it can be used with other machines than cash registers and indicators to add up a series of indications or registrations of any desired kind.

Having thus described my invention, what I claim is—

1. In combination with a series of keys and movable devices, a shaft, a series of arms on the latter, one for each key, having the concave key-engaging surfaces extending on curved lines upward and outward across the paths of the keys, the direction of the different curved surfaces with reference to the paths of the respective keys being varied so that such surfaces are at different distances from the keys and extend to different distances across the respective key-paths, and registering mechanism connected with the shaft so as to be actuated thereby, substantially as and for the purpose described.

2. In combination with a series of keys, a shaft, the arms thereon, one for each key, with their portions in the paths of the keys differently arranged with reference to the key travel, an arm on the shaft, a connecting-rod attached thereto, a swinging arm also connected with the rod, a ratchet-wheel, and a pawl on the latter arm to engage the ratchet-wheel, substantially as and for the purpose described.

3. In a registering mechanism, in combination with a series of keys or movable devices, a rock-shaft, a series of arms thereon, one for each key, differently arranged with relation to the travel of the different keys, an arm attached to the shaft, a rod connecting such arm with a swinging pawl-arm provided with a pawl and a ratchet-wheel, and registering devices actuated thereby, substantially as and for the purpose specified.

4. In a registering mechanism, in combination with a series of keys, a rock-shaft, arms thereon, one in the path of each key, having their portions to be engaged by the keys differently arranged with reference to the key travel, another arm on the shaft, a rod connected therewith, a swinging arm also connected with the rod, a pawl on such arm, and a ratchet-wheel having its teeth so arranged that the pawl will move the wheel a different number of teeth as different keys are actuated, substantially as and for the purpose shown.

5. In a registering apparatus, in combination with a series of keys, a rock-shaft, a series of arms on such shaft to be engaged by the different keys, having their key-engaging portions differently arranged with reference to the different keys, another arm on the shaft, a swinging pawl-arm connected therewith, a pawl on the same, a ratchet-wheel connected with register devices and adapted to be turned by the pawl during the movement of the pawl-arm by the engagement of a key with one of the rock-shaft arms, and means for rotating the shaft and swinging the pawl-arm back to their normal positions again after they have been moved, substantially as and for the purpose set forth.

6. In a registering apparatus, in combination with a series of keys, a rock-shaft, key-engaging arms on the same having their key-engaging portions differently arranged with relation to the travel of the keys so that movement of the different keys will cause different amounts of rotation of the shaft, a ratchet-wheel, a swinging pawl-arm connected with the shaft so as to be moved thereby, means for returning the shaft and pawl-arm to their normal positions after they have been moved by a key, the ratchet-wheel, and a pawl on the pawl-arm to engage the teeth on the wheel and turn the latter on the return movement of such arm, substantially as and for the purpose described.

7. In a registering mechanism, in combination with a series of keys, a rock-shaft, arms thereon having their portions to be engaged by the keys differently arranged with reference to the travel of the keys, means for returning the shaft-arms to their normal positions after they have been moved by the keys, a swinging arm carrying a pawl connected with the shaft, so as to be moved thereby, and the ratchet-wheel having its teeth so arranged that the pawl will as the different keys are actuated ride over a different number of teeth and upon its return movement will positively engage the teeth and turn the wheel, substantially as and for the purpose specified.

8. In combination with a toothed wheel, a movable arm carrying a pawl to engage the wheel-teeth, a piece under which the pawl passes at a certain point in its travel adapted to force the pawl end toward the wheel, so that a tooth on the latter cannot pass under the same, and yielding stop for arresting and moving the arm back to release the pawl from the bearing-piece and holding it normally so moved, substantially as and for the purpose specified.

9. In combination with a toothed wheel, a movable arm, a pawl on the latter to engage the wheel-teeth, a movable arm connected with the pawl-arm to operate the same, a spring-stop device to check the movement of such actuating-arm and a block or bearing-piece under which the pawl rides and by which it is forced down toward the wheel, substantially as and for the purpose shown.

10. In combination with the toothed wheel, a movable arm, a pawl on the latter to engage the wheel-teeth, a stationary piece adapted to engage and force the pawl end down toward the wheel as it passes a certain point, means for swinging the pawl-arm, and a spring-stop to keep the pawl-arm with its pawl normally just out of engagement with the stationary piece, substantially as and for the purpose set forth.

11. In combination with a toothed wheel, a movable arm carrying a pawl to engage the wheel-teeth, the movable part for actuating such arm, a spring for actuating such part to cause the arm to turn the wheel by its pawl, a spring-stop for the actuating part made stronger than the actuating-spring, and a stationary piece adapted to engage and force the pawl down toward the wheel as such pawl passes just beyond the point at which the spring-stop would normally keep it, substantially as and for the purpose described.

12. In combination with a toothed wheel and a movable arm carrying a pawl to engage the wheel-teeth, a movable part to actuate the pawl-arm, a spring to move such part to rotate the wheel, a spring-stop adapted to yield slightly to the momentum of the moving part and pawl-arm and then move such arm and part back to their normal positions, and a block situated so as to engage and force the pawl end down between the wheel-teeth as the pawl moves beyond its normal position, substantially as and for the purpose specified.

13. In combination with the toothed wheel and the movable arm carrying a pawl to engage the wheel-teeth, a rock-shaft connected with such arm so as to move the same, a spring to rock the shaft, a stop, a spring-stop arm on the shaft to engage such stop made stronger than the shaft-moving spring, and a piece or block to force the pawl down upon the toothed wheel as it passes slightly beyond the point at which it is normally kept by the action of the stop-arm on the shaft, substantially as and for the purpose shown.

14. In combination with a shaft, a brake for the same, consisting of a disk fixed on the shaft, a second disk attached to the end of a spring whose outer end is attached to a support independent of the shaft, and a friction-disk between the two disks, substantially as and for the purpose set forth.

15. In combination with a shaft, the brake therefor, consisting of a disk or plate fixed to the shaft, a second disk or plate independent of the shaft, a spiral spring surrounding the latter and attached at one end to the second disk or plate and at the other to a fixed support, and a piece of friction material between the two disks, substantially as and for the purpose described.

16. In a registering mechanism, in combination with the two registering devices for registering, respectively, amounts of a higher and lower denomination, two separate series of actuating-keys for such registers, and connections between the latter and the respective series of keys, whereby the lower-denomination-registering device is actuated by the forward movement of any one of its keys, and the other register is actuated during the return movement of any one of its respective series of keys, substantially as and for the purpose described.

17. In a registering apparatus, in combination with two series of actuating-keys and two sets of registering devices, and connections between the keys and such devices, whereby the latter are turned forward, the one as a key in the respective series is moved in one direction and the other as a key in the other series is moved in the opposite direction, substantially as and for the purpose shown.

18. In a cash-registering apparatus, in combination with the separate cent and dollar series of keys, separate registering devices for the series, and connections between the keys and registering devices, whereby the cent-register is actuated as a key is moved forward and the dollar-register is actuated upon the turn of a dollar-key, substantially as and for the purpose set forth.

19. In a cash-register, in combination with the cent and dollar series of keys, a wheel for each series, each connected with a separate register so as to actuate the same, and means for turning the wheels as keys in the respective series are moved in opposite directions, substantially as and for the purpose described.

20. In a cash register and indicator, in combination with the cent and dollar series of keys and the two toothed wheels, one for each series, connected with separate registers, movable arms, one for each wheel, connections between the keys and such arms, whereby one is moved by any one of the cent and the other by any dollar key, means for returning these arms after movement by the keys, and pawls on the arms to engage and move the respective wheels as the arms move in opposite directions, substantially as and for the purpose specified.

21. In a cash-register, in combination with the cent and dollar series of keys and the toothed wheels, one for each key series, connected with separate registers, movable pawl-carrying arms, one for each wheel, two moving parts adapted to be moved by the actuation of the cent and dollar keys, respectively, means for returning such parts after they have been moved by the keys, connections between them and the pawl-arms, and pawls on the latter adapted to turn their respective wheels forward upon the raising of a cent-key and a returning of a dollar one, substantially as and for the purpose shown.

22. In a cash-register, in combination with the cent and dollar keys, the rock-shaft adapted to be rotated by the cent and dollar keys, respectively, springs to turn them back after rotation, toothed register-operating wheels, one for each shaft, a movable arm for each wheel connected with the cent and dollar key shafts, respectively, so as to be moved thereby, and the pawls on the arms adapted to turn the respective wheels forward as a cent-key is moved and a dollar-key has been moved and return to its normal position again, substantially as and for the purpose set forth.

23. In a registering apparatus, in combination with a wheel carrying a pin, a swinging arm, a spring holding such arm in the path of the wheel-pin, a pawl on the arm, a toothed wheel engaged by the pawl, another pin on the wheel, and a spring-pressed arm into engagement with which the latter pin is brought by the revolution of the wheel as the former pin passes off of the pawl-carrying arm, substantially as and for the purpose described.

24. In a registering apparatus, in combination with a wheel having three equidistant pins, a swinging arm, a spring holding such arm in the path of the pins, a pawl on the arm, a toothed wheel engaged by the pawl, and a spring-pressed brake-arm adapted to engage one of the pins each time that the pawl-arm passes out of engagement with one of the other pins, substantially as and for the purpose specified.

25. In a registering apparatus, in combination with a toothed wheel and a spring-actuated arm carrying a pawl engaging the wheel-teeth, two or more pins on the wheel, a swinging arm, a pawl on the same, a toothed wheel engaged by the pawl, a spring holding the arm in the path of the wheel-pins, and a brake-arm adapted to be engaged by one of the pins each time that another pin passes out of engagement with the second pawl-arm, substantially as and for the purpose shown.

26. In combination with the series of toothed wheels and the pawls for actuating the same, the means for tripping the pawls and holding them out of operative position, which consists in a movable piece having the pawl-engaging pins, and a spring for drawing such piece longitudinally into position with its pins normally out of engagement with the pawls and holding it normally in such position, substantially as and for the purpose described.

27. In combination with the series of toothed wheels and the pawls for actuating the same, the movable piece provided with the pawl-tripping pins, a spring to hold the piece normally in position with its pins out of engagement with the pawls, and a latch device to hold it in position with its pins engaging and holding the pawls out of engagement with the wheel-teeth, substantially as and for the purpose specified.

28. In a registering apparatus, in combination with the casing having a movable lid to cover the mechanism, a lock for such lid, and a hinged cover for the registering devices, having a hasp adapted to be engaged by a tongue on the casing-lid when the latter is closed, substantially as and for the purpose shown.

In testimony that I claim the foregoing I have hereunto set my hand this 27th day of March, A. D. 1890.

CABEL B. HOPKINS.

Witnesses:
S. B. SCOTT,
DAVID T. BRADFORD.